(12) United States Patent
Li

(10) Patent No.: US 11,451,165 B2
(45) Date of Patent: Sep. 20, 2022

(54) CONTROL PROCESSING METHOD FOR INVERTER DEVICE HAVING H5 TOPOLOGICAL STRUCTURE

(71) Applicant: SMA Solar Technology AG, Niestetal (DE)

(72) Inventor: Ning Li, Suzhou (CN)

(73) Assignee: SMA Solar Technology AG, Niestetal (DE)

( * ) Notice: Subject to any disclaimer, the term of this patent is extended or adjusted under 35 U.S.C. 154(b) by 3 days.

(21) Appl. No.: 16/813,959

(22) Filed: Mar. 10, 2020

(65) Prior Publication Data

US 2020/0212825 A1 Jul. 2, 2020

Related U.S. Application Data

(63) Continuation of application No. PCT/EP2018/073884, filed on Sep. 5, 2018.

(51) Int. Cl.
*H02J 3/38* (2006.01)
*H02M 7/5387* (2007.01)
(Continued)

(52) U.S. Cl.
CPC ......... *H02M 7/53871* (2013.01); *H02J 3/381* (2013.01); *H02J 3/388* (2020.01);
(Continued)

(58) Field of Classification Search
CPC ............... H02J 3/381; H02J 3/388; H02J 7/35
See application file for complete search history.

(56) References Cited

U.S. PATENT DOCUMENTS 5,977,659 A 11/1999 Takehara
2005/0286281 A1 12/2005 Victor
(Continued)

FOREIGN PATENT DOCUMENTS

CN 201263091 Y 6/2009
CN 203761131 U 8/2014
(Continued)

OTHER PUBLICATIONS

M. Islam, S. Mekhilef, "An improved transformerless grid connected photovoltaic inverter with reduced leakage current", Sep. 28, 2014, Energy Conversion and Management, vol. 88, 2014, pp. 854-862. (Year: 2014).*
(Continued)

*Primary Examiner* — Rexford N Barnie
*Assistant Examiner* — David A Shiao
(74) *Attorney, Agent, or Firm* — Eschweiler & Potashnik, LLC

(57) ABSTRACT

The present disclosure discloses a control processing method for an inverter device having an H5 topological structure. The control processing method includes: when a power grid supplies power normally, using a unipolar H5 PWM modulation mode to enable the inverter device to work in a grid-connected power generation mode; when the power grid supplies power abnormally or the power grid is in outage for a short time, using a unipolar H5 PWM constant-voltage modulation mode to enable the inverter device to work in an off-grid power generation mode; and when the power grid is in outage for a long time, using an H5-1 PWM constant-voltage modulation mode to enable the inverter device to work in an emergency SPS power generation mode.

20 Claims, 2 Drawing Sheets

(51) Int. Cl.
  *H02J 9/06* (2006.01)
  *H02M 7/797* (2006.01)
(52) U.S. Cl.
  CPC .............. *H02J 9/062* (2013.01); *H02M 7/797* (2013.01); *H02J 2300/26* (2020.01)

(56) References Cited

U.S. PATENT DOCUMENTS

| | | | |
|---|---|---|---|
| 2007/0177338 A1 | 8/2007 | Nishi | |
| 2008/0203820 A1* | 8/2008 | Kramer | H02J 3/38 307/64 |
| 2011/0148360 A1* | 6/2011 | Lee | H02J 7/35 320/134 |
| 2011/0255316 A1 | 10/2011 | Burger | |
| 2012/0032507 A1* | 2/2012 | Yamane | H02J 9/062 307/23 |
| 2013/0020873 A1 | 1/2013 | Barlock | |
| 2013/0099566 A1* | 4/2013 | Pfitzer | H02J 3/14 307/29 |
| 2013/0169064 A1* | 7/2013 | Park | H02J 3/28 307/112 |
| 2015/0108833 A1* | 4/2015 | Ito | H02J 3/387 307/23 |
| 2019/0237995 A1* | 8/2019 | Akita | H02J 9/06 |

FOREIGN PATENT DOCUMENTS

| | | |
|---|---|---|
| DE | 102012011708 A1 | 12/2013 |
| EP | 2254231 A1 | 11/2010 |
| JP | 2014166000 A | 9/2014 |
| KR | 20090036751 A * | 4/2009 |
| KR | 20170023379 A | 3/2017 |

OTHER PUBLICATIONS

T. K. S. Freddy, J. Lee, H. Moon, K. Lee and N. A. Rahim, "Modulation Technique for Single-Phase Transformerless Photovoltaic Inverters With Reactive Power Capability," Mar. 22, 2017, in IEEE Transactions on Industrial Electronics, vol. 64, No. 9, pp. 6989-6999, Sep. 2017. (Year: 2017).*

International Search Report and Written Opinion dated Nov. 26, 2018 in connection with PCT/EP2018/073884.

* cited by examiner

CONTROL PROCESSING METHOD FOR INVERTER DEVICE HAVING H5 TOPOLOGICAL STRUCTURE

CROSS REFERENCE TO RELATED APPLICATIONS

This application is a continuation of International Patent Application number PCT/EP2018/073884, filed on Sep. 5, 2018, which claims priority to Chinese Patent Application number 201710818204.X, filed on Sep. 12, 2017, and is hereby incorporated by reference in its entirety.

FIELD

The present disclosure relates to an inverter technique, in particular to a control processing method for an inverter device having an H5 topological structure.

BACKGROUND

As a core device for converting direct-current power provided by a solar module into alternating-current power for civil or industrial use, photovoltaic inverters take an increasingly important place in the field of new energy. In recent years, transformer-less photovoltaic inverters developed fast and are widely applied in the market. However, most inverters in the market at present only have a single function such as a grid-connected or off-grid function. Even though they have integrated functions such as grid-connected, off-grid and energy storage functions, the operation and control methods of most inverters are single, and the overall efficiency and safety friendliness of the system are deficient. With the sharp increase of the demands of the photovoltaic market, photovoltaic inverters having integrated function of grid-connected, off-grid and emergency SPS become increasingly popular with people.

SUMMARY

The present disclosure provides a control processing method for an inverter device having an H5 topological structure, so as to solve the problem of the prior art.

In order to achieve the purpose of the present disclosure, the present disclosure provides a control processing method for an inverter device having an H5 topological structure, and the inverter device has an H5 topological inverter bridge structure and grid-connected, off-grid and emergency Solar Power from Space (SPS) integrated functions. The control processing method includes: when a power grid supplies power normally, using a first control mode to operate the inverter device, wherein in the first control mode, a unipolar H5 PWM modulation mode is used to enable the inverter device to work in a grid-connected power generation mode. When the power grid supplies power abnormally or the power grid is in outage for a short time, the method comprises using a second control mode to operate the inverter device, wherein in the second control mode, a unipolar H5 PWM constant-voltage modulation mode is used to enable the inverter device to work in an off-grid power generation mode. When the power grid is in outage for a long time, the method comprises using a third control mode to operate the inverter device, wherein in the third control mode, an H5-1 PWM constant-voltage modulation mode is used to enable the inverter device to work in an emergency SPS power generation mode.

Further, the inverter device couples to a PV unit, and includes a switch circuit or unit, a first load, a second load, a conversion circuit unit, and optionally a capacitive energy storage circuit or unit. The capacitive energy storage unit may alternatively be external to and coupled to an input of the inverter device. In the first control mode, the switch unit is switched to a first working mode to enable an alternating-current power source to drive the first load to work and enable the alternating-current power source to be connected after passing though the conversion circuit, to the PV unit and the capacitive energy storage circuit, and the capacitive energy storage circuit is in an energy storage state. In the second control mode, the switch circuit is switched to a second working mode to cut off the alternating-current power source and enable the capacitive energy storage circuit to be connected with the first load through the conversion module, to make the capacitive energy storage circuit discharge to drive the first load to work. In the third control mode, the switch circuit is switched to a third working mode to cut off the alternating-current power source and enable the capacitive energy storage circuit to be connected with the second load through the conversion module, to make the capacitive energy storage circuit discharge to drive the second load to work.

Further, in one embodiment the second load includes the first load.

Further, the conversion circuit in the inverter device is a DC-AC conversion circuit or a DC-DC conversion circuit.

Further, the switch circuit includes a first switch, a second switch, a third switch and a fourth switch, wherein the first switch, the second switch and the third switch are connected in series and then are connected between the conversion circuit and the alternating-current power source. The first switch is connected with the conversion circuit and the third switch is connected with the alternating-current power source. Two ends of the first load are respectively connected with a live line and a null line, and the first load is connected between the second switch and the third switch. The second load and the fourth switch are connected in series and then are used as an integral body. Two ends of the integral body are respectively connected with the live line and the null line, and the integral body is connected between the first switch and the second switch.

Further, in one embodiment when the switch circuit is switched to the first working mode, the first switch, the second switch and the third switch are closed, and the fourth switch is opened. When the switch circuit is switched to the second working mode, the first switch and the second switch are closed, and the third switch and the fourth switch are opened. Lastly, when the switch circuit is switched to the third working mode, the first switch and the fourth switch are closed, and the second switch and the third switch are opened.

Further, in the off-grid power generation mode, an input end voltage of the first load is automatically adjusted according to a first change rate k1 within a first preset range based on a load condition. The input end voltage of the first load is increased when the load is heavy, and the input end voltage of the first load is decreased when the load is light.

Further, the inverter device includes a fifth switch, a working mode of an inverter device is automatically controlled according to illumination intensity prediction in the emergency SPS power generation mode, the fifth switch works in an SPWM mode when the illumination intensity is strong, and the fifth switch works in a direct mode when the illumination intensity is weak.

Further, in the emergency SPS power generation mode, an input end voltage of the second load is automatically adjusted according to a second change rate k2 within a second preset range based on a load condition. The input end voltage of the second load is increased when the load is heavy, and the input end voltage of the second load is decreased when the load is light.

Further, in the emergency SPS power generation mode, an input end voltage of the second load is automatically adjusted within a third preset range based on Vmppt voltage. In one embodiment an AC output end voltage is 0.5*Urate2 when Vmppt<(r*Urate2+20V); and an AC output end voltage is (Vmppt−20V)/r when Vmppt≥(rUrate2+20V), where Urate1 is the input end voltage of the first load and Urate2 is the input end voltage of the second load. Vmppt is the maximum power point trackingn voltage.

As compared with the prior art, the control processing method for the inverter device having the H5 topological structure provided by the present disclosure can guarantee that the inverter device under an integrated working environment of grid-connected, off-grid and emergency SPS can have higher safety, reliability, efficiency and intelligence friendliness.

Further, when the power grid supplies power normally, the inverter device is in a grid-connected state, at this moment the switches S1, S2 and S3 are in a closed state and the switch S4 is in an opened state. For the H5 inverter bridge which uses the unipolar H5 PWM modulation mode, the common-mode voltage of the system can be effectively guaranteed, the leakage current of the system is effectively reduced and the safety of the system is guaranteed. As compared with topologies such as HERIC, the efficiency is higher and better profits are created for users.

Further, when the power grid supplies power abnormally or the power grid is in outage for a short time, the inverter device works in an off-grid state. At this moment the switches S1 and S2 are in a closed state, and the switches S3 and S4 are in an opened state. For the H5 inverter bridge which uses the unipolar H5 PWM constant-voltage modulation mode, the stability and the reliability of the user power supply system are guaranteed. In this working state, in one embodiment the inverter device can automatically adjust the output voltage Urate1 according to the change rate k1 within 100%-75% of rated voltage based on the load condition. When the load is heavy, the output voltage is increased to decrease the output current and to decrease the loss of the system, and the efficiency of the system can be effectively improved.

Further, when the power grid is in outage for a long time, the power of the photovoltaic system seems particularly precious, in one embodiment the use of the power for important loads is preferentially satisfied, and the maximum utilization of the system efficiency is guaranteed. At this moment, the inverter device works in an emergency SPS state, at this moment the switches S1 and S4 are in a closed state, and the switches S2 and S3 are in an opened state; for the H5 inverter, the unipolar H5-1 PWM constant-voltage modulation mode is used. In case of sufficient illumination intensity in this modulation mode, the switch T5 is in a sine PWM (SPWM) working mode, like the normal H5 PWM constant-voltage modulation working mode. At this moment the inverter system has a better common-mode feature and can guarantee the normal working of the load. When the illumination intensity is weak, the switch T5 is in a direct working mode. The H5 inverter bridge module works in an H4 PWM constant-voltage modulation mode. At this moment, since there is no switch loss of the switch T5 and the device output voltage is automatically adjusted according to the load condition and the Vmppt voltage of the photovoltaic inverter device, the inverter device system is enabled to always work under the maximum efficiency. Herein, when the load is heavy, Urate2 is increased; and when the load is light, Urate2 is decreased. Thus the output voltage is automatically adjusted according to the change rate k2 within 100%-50% based on the load condition. In one embodiment AC output end voltage is 0.5*Urate2 when Vmppt<(r*Urate2+20V); and AC output end voltage is (Vmppt−20V)/r when Vmppt≥(rUrate2+20V).

Other features and advantages of the present disclosure will be described below in the description, and will partially become apparent from the description or can be understood by implementing the present disclosure. The purposes and other advantages of the present disclosure can be realized and achieved through structures particularly pointed out in the description, claims and drawings.

BRIEF DESCRIPTION OF DRAWINGS

The drawings are used for providing further understanding about the technical solution of the present disclosure, constitute a part of the description, are used together with embodiments of the present disclosure for explaining the technical solution of the present disclosure, and do not constitute limitations to the technical solution of the present disclosure.

DETAILED DESCRIPTION

Figure 1:
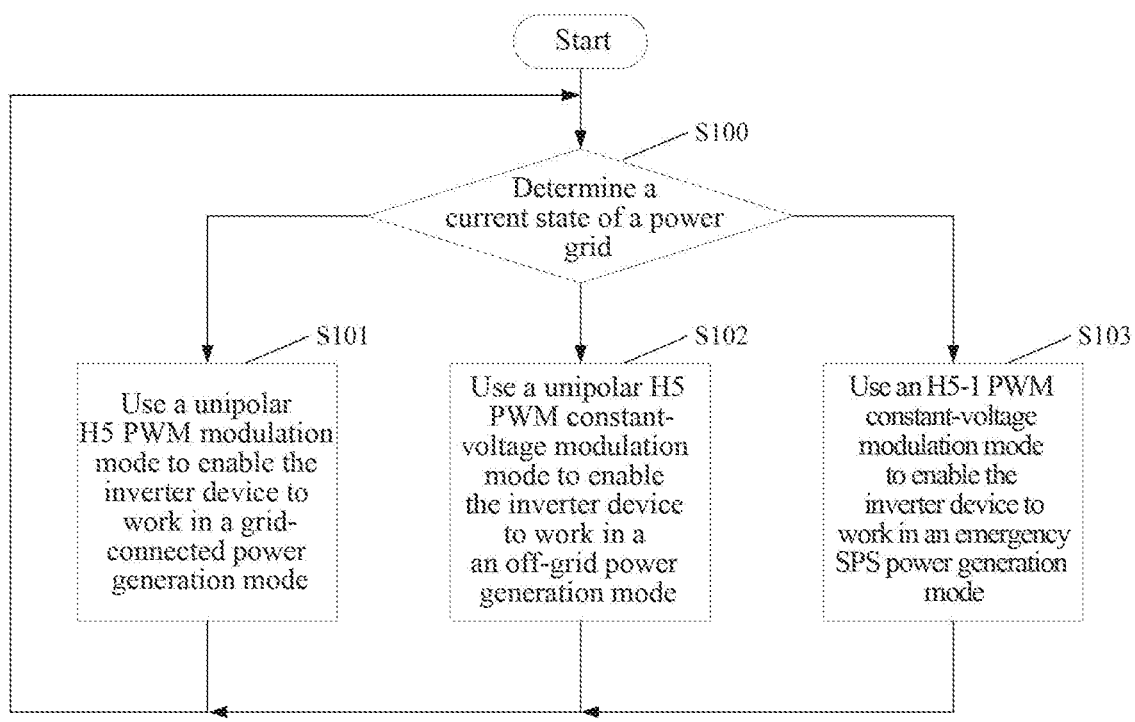
FIG. 1 illustrates a flowchart of a control processing method for an inverter device having an H5 topological structure according to the present disclosure.

In order to make the purposes, the technical solutions and advantages of the present disclosure more clear, embodiments of the present disclosure will be described below in detail with reference to the drawings. It needs to be stated that embodiments in the present application and the features in the embodiments may be mutually and freely combined under a situation of no conflict.

Acts illustrated by the flowchart in the drawings may be executed by one or more processors or other circuitry in a computer system in accordance with a group of computer-executable instructions. In addition, although a logical sequence is illustrated in the flowchart, under certain situations, the illustrated or described acts may be executed according to a sequence different from the sequence here.

The embodiment of the present disclosure provides a control processing method for an inverter device having an H5 topological structure. The control processing method includes: when a power grid supplies power normally, using a first control mode to operate the inverter device, wherein in the first control mode, a unipolar H5 PWM modulation mode is used to enable the inverter device to work in a grid-connected power generation mode. When the power grid supplies power abnormally or the power grid is in outage for a short time, using a second control mode to operate the inverter device, wherein in the second control mode, a unipolar H5 PWM constant-voltage modulation mode is used to enable the inverter device to work in an off-grid power generation mode. Lastly, when the power grid is in outage for a long time, using a third control mode to operate the inverter device, wherein in the third control mode, an H5-1 PWM constant-voltage modulation mode is used to enable the inverter device to work in an emergency SPS power generation mode.

FIG. 1 illustrates a flowchart of a processing example of a control processing method for an inverter device having an H5 topological structure according to the present disclosure.

As illustrated in FIG. 1, after the process starts, firstly act S100, i.e., determining a current state of the power grid, is executed.

When the power grid supplies power normally, act S101 is executed.

At S101, a first control mode is used to operate the inverter device. In the first control mode, a unipolar H5 PWM modulation mode is used to enable the inverter device to work in a grid-connected power generation mode. In this way, the inverter is enabled to have higher efficiency and lower leakage current, such that it works in the grid-connected power generation mode safely and efficiently. Herein, the unipolar H5 PWM modulation mode refers to a mode of using a unipolar PWM modulation mode for an H5 topological switch architecture.

When the power grid supplies power abnormally or the power grid is in outage for a short time, act S102 is executed. Herein, the situation that the power grid is in outage for a short time, for example, refers to a situation that the power grid is in outage and the power of the power generation system is greater than the current load power.

At S102, a second control mode is used to operate the inverter device. In the second control mode, a unipolar H5 PWM constant-voltage modulation mode is used to enable the inverter device to work in an off-grid power generation mode. In this way, the inverter device can be enabled to have higher efficiency, lower leakage current and more stable power quality, to make it work in the off-grid power generation mode safely and efficiently. Herein, the unipolar H5 PWM constant-voltage modulation mode refers to a mode of using a unipolar PWM modulation mode for an H5 topological switch architecture, controlling an AC output side by using a voltage loop and making the output voltage be a specific real-time set value.

When the power grid is in outage for a long time, act S103 is executed. Herein, the situation that the power grid is in outage for a long time, for example, refers to a situation that the power grid is in outage and the power of the power generation system is less than the current load power.

At S103, a third control mode is used to operate the inverter device. In the third control mode, an H5-1 PWM constant-voltage modulation mode is used to enable the inverter device to work in the emergency SPS power generation mode. In this way, the inverter device can have high-efficiency and high-safety emergency power source function, more stable power quality and higher efficiency, to make it work in the emergency SPS generation mode safely and efficiently. Herein, the H5-1 PWM constant-voltage modulation mode refers to a mode of using direct control for the switch T5 in an H5 topology, using a unipolar PWM modulation mode for H-bridge switches T1-T4, controlling an AC output side by using a voltage loop and making the output voltage as a specific real-time set value.

According to one implementation mode, the inverter device is connected to a PV unit and may include a switch circuit, a first load Load1, a second load Load2, a conversion circuit, and optionally a capacitive energy storage circuit. Alternatively, the capacitive energy storage circuit may be external to and connected to an input of the inverter device.

In the first control mode, for example, the switch circuit may be switched to a first working mode to enable an alternating-current power source to drive the first load to work and enable the alternating-current power source to be grounded after passing though the conversion circuit, and the capacitive energy storage circuit to the PV unit, and the capacitive energy storage circuit is in an energy storage state.

In the second control mode, for example, the switch circuit may be switched to a second working mode to cut off the alternating-current power source and enable the capacitive energy storage circuit to be connected with the first load and the conversion module, to make the capacitive energy storage circuit discharge to drive the first load to work.

In the third control mode, for example, the switch circuit may be switched to a third working mode to cut off the alternating-current power source and enable the capacitive energy storage circuit to be connected with the second load through the conversion module, to make the capacitive energy storage circuit discharge to drive the second load to work.

In one embodiment the second load, for example, may include the first load.

In one embodiment the first load may be a load of a universal photovoltaic power generation system, such as household electrics, lighting or vehicle charging load.

In one embodiment the second load, for example, may be a load that needs to be used or work in a power shortage state, such as a mobile phone charger, an emergency lighting power source load or a firefighting power source load.

Besides, the conversion circuit in the inverter device, for example, may be a DC-AC conversion circuit or a DC-DC conversion circuit.

Figure 2:
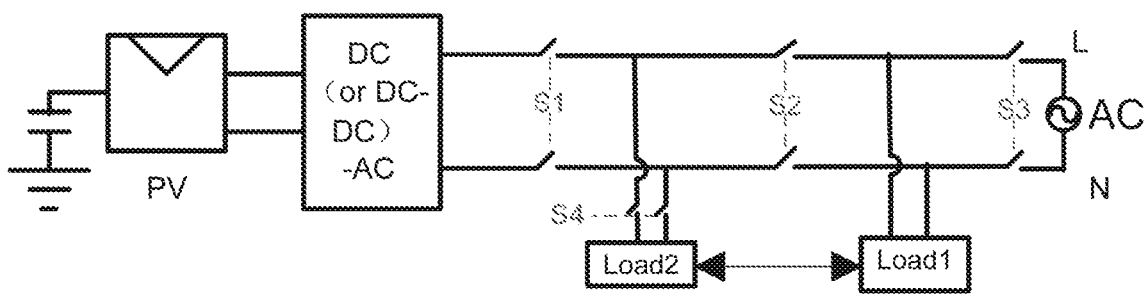
FIG. 2 illustrates a structural schematic diagram of an inverter device having an H5 topological structure.

According to one implementation mode, as illustrated in FIG. 2, the switch circuit, for example, may include a first switch S1, a second switch S2, a third switch S3 and a fourth switch S4, wherein the first switch, the second switch and the third switch are connected in series and then are connected between the conversion circuit (e.g., DC-AC) and the alternating-current power source AC. The first switch is connected with the conversion circuit and the third switch is connected with the alternating-current power source. Two ends of the first load, for example, are respectively connected with a live line and a null line, and the first load is connected between the second switch and the third switch. The second load and the fourth switch are connected in series and then are used as an integral body, two ends of the integral body are respectively connected with the live line and the null line, and the integral body is connected between the first switch and the second switch.

For example, when the switch circuit is switched to the first working mode, the first switch, the second switch and the third switch are closed, and the fourth switch is opened. When the switch circuit is switched to the second working mode, the first switch and the second switch are closed, and the third switch and the fourth switch are opened. When the switch circuit is switched to the third working mode, the first switch and the fourth switch are closed, and the second switch and the third switch are opened.

According to one implementation mode, in the off-grid power generation mode, an input end voltage Urate1 of the first load Load1 is automatically adjusted according to a first change rate k1 within a first preset range based on a load condition. The input end voltage of the first load is increased when the load is heavy, and the input end voltage of the first load is decreased when the load is light. Herein, in one embodiment the first preset range, for example, may be 100%-75% but is not limited thereto. Herein, the first change rate k1 refers to a charge adjustment rate of the output load end voltage in the off-grid power generation mode and is obtained by detecting the voltage and current of the input end of the load at a current moment (tn) and the voltage and current of the input end of the load at a previous moment (tn−1).

Figure 3:
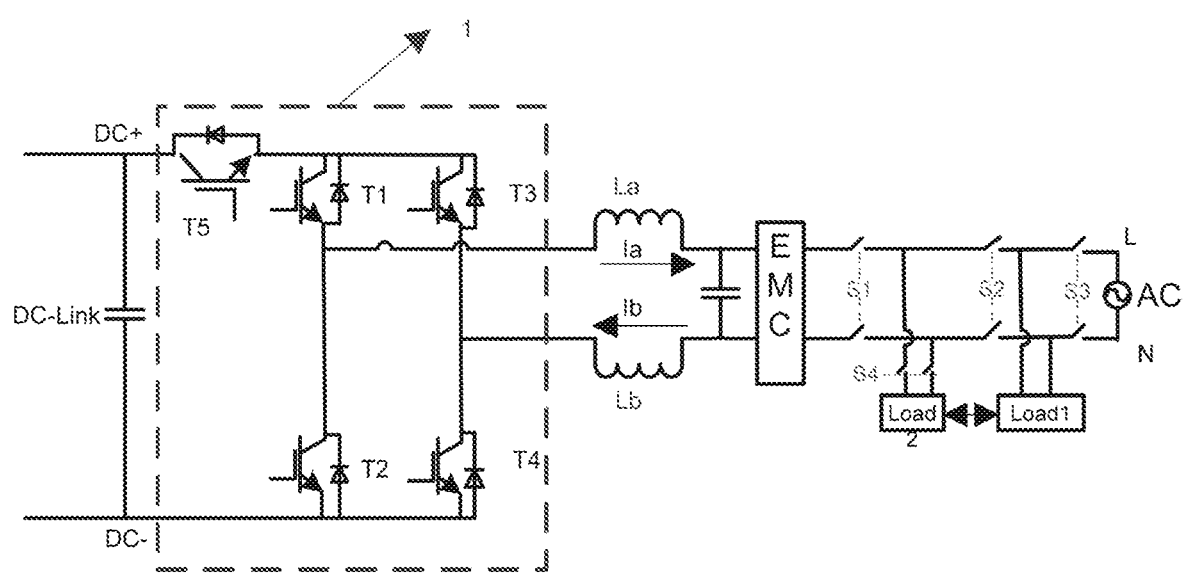
FIG. 3 illustrates a structural diagram of an example of an H5 topological inverter device.

According to one implementation mode, as illustrated in FIG. 3, an H5 topological circuit or structure 1 (the part illustrated by a dashed frame) of the inverter device comprises a first switch T1, a second switch T2, a third switch T3, a fourth switch T4 and a fifth switch T5. Herein, a capacitor DC-Link is connected between DC+ and DC−, one end of the fifth switch T5 is connected with DC+ and the other end is connected with the first switch T1. In the drawing, DC-Link is a BUS capacitor, La and Lb are inverter output inductors, and Load1 and Load2 are the first load and the second load.

The working mode of an inverter circuit or module is automatically controlled for example according to illumination intensity prediction in the emergency SPS power generation mode. In one embodiment the fifth switch T5 works in an SPWM mode when the illumination intensity is strong, and the fifth switch T5 works in a direct mode when the illumination intensity is weak.

According to one implementation mode, in the emergency SPS power generation mode, an input end voltage of the second load, for example, may be automatically adjusted according to a second change rate k2 within a second preset range based on a load condition. The input end voltage of the second load is increased when the load is heavy, and the input end voltage of the second load is decreased when the load is light. The second preset range, for example, may be 100%-50% but is not limited thereto. The second change rate k2 refers to a charge adjustment rate of the output load end voltage in the emergency SPS power generation mode and is obtained in one embodiment by detecting the voltage and current of the input end of the load at a current moment (tn) and the voltage and current of the input end of the load at a previous moment (tn−1).

According to one implementation mode, in the emergency SPS power generation mode, the input end voltage of the second load, for example, may be automatically adjusted within a third preset range according to Vmppt. In one embodiment the AC output end voltage is 0.5*Urate2 when Vmppt<(r*Urate2+20V); and the AC output end voltage is (Vmppt−20V)/r when Vmppt≥(rUrate2+20V).

Urate1 is the input end voltage of the first load, Urate2 is the input end voltage of the second load, and r is an AC-DC coefficient, for example, and may be 1.414, and however is not limited to 1.414. Vmppt is a voltage across two ends of the capacitor DC-Link.

The third preset range, for example, may be 100%-50% but is not limited thereto.

Although the present disclosure discloses the implementation modes above, the above-mentioned contents are just implementation modes used for facilitating the understanding about the present disclosure instead of limiting the present disclosure. One skilled in the art may make any modification and variation to the implementation modes and details without departing from the essence and scope disclosed by the present disclosure. However, the patent protection scope of the present disclosure shall be still subject to the scope defined by the attached claims.

The invention claimed is:

1. A multi-mode inverter system configured to couple to a PV unit at its input, and coupled to an AC power source at its output, comprising:
a capacitive energy source configured to couple to the PV unit;
a conversion circuit having an input coupled to the capacitive energy source, and having an output, wherein the conversion circuit comprises a first transistor, a second transistor, a third transistor, a fourth transistor, and a fifth transistor coupled together to form an H5 topological structure;
a switching network comprising a first switch, a second switch, and a third switch connected in series with one another between the output of the conversion circuit and the AC power source, wherein the first switch is coupled to the output of the conversion circuit and the third switch is coupled to the AC power source, and the second switch is coupled between the first switch and the third switch at a first node and a second node, respectively;
a switch circuit configured to control the switching network based on a condition associated with the AC power source;
a first load connected to the second node between the second and third switches;
a second load connected via a fourth switch to the first node between the first and second switches,
wherein the switch circuit is configured to control the first, second, third and fourth switches based on the condition associated with the AC power source to achieve three distinct modes of operation in which one or both of the first and second loads receive power,
wherein the three distinct modes of operation comprise a first control mode comprising a grid-connected power generation mode, a second control mode comprising an off-grid power generation mode, and a third control mode comprising a Solar Power from Space (SPS) power generation mode,
wherein in the SPS power generation mode, the fifth transistor in the H5 topological structure of the conversion circuit is controlled in a sine PWM mode when an illumination intensity satisfies a first illumination criteria, and is controlled in a direct working mode that is different than the sine PWM mode when the illumination intensity satisfies a second, different illumination criteria.

2. The multi-mode inverter system of claim 1, wherein the switch circuit is configured to control the first, second, third and fourth switches in the grid-connected power generation mode when the condition associated with the AC power source is normal according to one or more predetermined criteria.

3. The multi-mode inverter system of claim 2, wherein the switch circuit is configured to close the first, second and third switches, and open the fourth switch in the grid-connected power generation mode.

4. The multi-mode inverter system of claim 2, wherein:
when the AC power source supplies power normally according to one or more predetermined criteria, the conversion circuit, the switch circuit and the switching network are configured to form the first control mode to operate the inverter system, wherein in the first control mode, a unipolar H5 pulse width modulation (PWM) modulation mode is used to enable the inverter system to work in the grid-connected power generation mode.

5. The multi-mode inverter system of claim 4, wherein:
in the first control mode, the switch circuit is switched to a first working mode to enable the AC power source to drive the first load to work and enable the AC power source to be connected after passing though the conversion circuit, to the PV unit and the capacitive energy source, and the capacitive energy source is in an energy storage state.

6. The multi-mode inverter system of claim 4, wherein in a working control mode, the inverter system is controlled according to an illumination intensity prediction, and the fifth transistor works in the sine PWM (SPWM) mode when the illumination intensity is strong according to a predetermined intensity criteria, and the fifth transistor works in the direct mode when the illumination intensity is weak according to the predetermined intensity criteria.

7. The multi-mode inverter system of claim 1, wherein the switch circuit is configured to control the first, second, third and fourth switches in the off-grid power generation mode when the condition associated with the AC power source indicates a first abnormal AC power source operation.

8. The multi-mode inverter system of claim 7, wherein the first abnormal AC power source operation is determined as an abnormal condition according to one or more predetermined criteria or a short term outage of the AC power source according to a predetermined timing criteria.

9. The multi-mode inverter system of claim 7, wherein the switch circuit is configured to close the first and second switches and open the third and fourth switches in the off-grid power generation mode.

10. The multi-mode inverter system of claim 9, wherein in the off-grid power generation mode, an input end voltage of the first load is adjusted by the capacitive energy source according to a first change rate within a first preset range based on a load condition of the first load, wherein the input end voltage of the first load is increased when the load condition is heavy according to a predetermined load criteria, and the input end voltage of the first load is decreased when the load condition is light according to the predetermined load criteria.

11. The multi-mode inverter system of claim 7, wherein:
when the power grid supplies power abnormally according to one or more predetermined criteria or the power grid is in outage for a short time according to a predetermined timing criteria, the conversion circuit, the switch circuit and the switching network are configured to form the second control mode to operate the inverter system, wherein in the second control mode, a unipolar H5 PWM constant-voltage modulation mode is used to enable the inverter system to work in the off-grid power generation mode.

12. The multi-mode inverter system of claim 11, wherein:
in the second control mode, the switch circuit is switched to a second working mode to cut off the AC power source and enable the capacitive energy source to be connected with the first load through the conversion circuit, to make the capacitive energy source discharge to drive the first load to work.

13. The multi-mode inverter system of claim 11, wherein in the off-grid power generation mode, an input end voltage of the first load is adjusted by the capacitive energy source according to a first change rate within a first preset range based on a load condition of the first load, wherein the input end voltage of the first load is increased when the load condition is heavy according to a predetermined load criteria, and the input end voltage of the first load is decreased when the load condition is light according to the predetermined load criteria.

14. The multi-mode inverter system of claim 11, wherein the switch circuit is configured to control the first, second, third and fourth switches in the Solar Power from Space (SPS) power generation mode when the condition associated with the AC power source indicates a second abnormal AC power source operation.

15. The multi-mode inverter system of claim 14, wherein the second abnormal AC power source operation comprises a long term outage of the AC power source determined according to a predetermined timing criteria.

16. The multi-mode inverter system of claim 14, wherein the switch circuit is configured to close the first and fourth switches and open the second and third switches in the SPS power generation mode.

17. The multi-mode inverter system of claim 14, wherein:
when the power grid is in outage for a long time according to predetermined timing criteria, the conversion circuit, the switch circuit and the switching network are configured to form the third control mode to operate the inverter system, wherein in the third control mode, an H5-1 PWM constant-voltage modulation mode is used to enable the inverter system to work in the SPS power generation mode.

18. The multi-mode inverter system of claim 17, wherein:
in the third control mode, the switch circuit is switched to a third working mode to cut off the AC power source and enable the capacitive energy source to be connected with the second load after passing through the PV unit and the conversion module, to make the capacitive energy source discharge to drive the second load to work.

19. The multi-mode inverter system of claim 1, wherein:
two ends of the first load are respectively connected between a live line and a null line at the second node between the second switch and the third switch; and
the second load and the fourth switch are connected together in series and together form an integral body, wherein two ends of the integral body are respectively connected between the live line and the null line at the first node between the first switch and the second switch.

20. The multi-mode inverter system of claim 19, wherein:
when the switch circuit is switched to a first working mode, the first switch, the second switch and the third switch are closed, and the fourth switch is opened;
when the switch circuit is switched to a second working mode, the first switch and the second switch are closed, and the third switch and the fourth switch are opened; and
when the switch circuit is switched to a third working mode, the first switch and the fourth switch are closed, and the second switch and the third switch are opened.

* * * * *